United States Patent
Gustafson et al.

(10) Patent No.: US 11,386,364 B1
(45) Date of Patent: Jul. 12, 2022

(54) CONSTRUCTION PROJECT INFORMATION AND DOCUMENT ACCESS SYSTEM

(71) Applicant: ECI Software Solutions, Inc., Fort Worth, TX (US)

(72) Inventors: Jeffrey Sven Gustafson, Orono, MN (US); Bradley Jared Johnson, Woodbury, MN (US)

(73) Assignee: ECI Software Solutions, Inc., Fort Worth, TX (US)

( * ) Notice: Subject to any disclaimer, the term of this patent is extended or adjusted under 35 U.S.C. 154(b) by 0 days.

(21) Appl. No.: 16/663,022

(22) Filed: Oct. 24, 2019

(51) Int. Cl.
*G06Q 10/06* (2012.01)
*G06K 19/06* (2006.01)
*G06K 7/10* (2006.01)
*G06K 7/14* (2006.01)
*G06K 19/07* (2006.01)

(52) U.S. Cl.
CPC ... *G06Q 10/06311* (2013.01); *G06K 7/10366* (2013.01); *G06K 7/1413* (2013.01); *G06K 7/1417* (2013.01); *G06K 19/06028* (2013.01); *G06K 19/06037* (2013.01); *G06K 19/0723* (2013.01)

(58) Field of Classification Search
CPC .. G06F 3/00; G06F 3/048; G06F 3/80; G06Q 10/06311; G06Q 10/109; G06Q 10/1097
USPC .............. 705/71.3, 7.12, 7.11; 717/101–130; 235/376, 487
See application file for complete search history.

(56) References Cited

U.S. PATENT DOCUMENTS

| | | | |
|---|---|---|---|
| 5,950,206 A | 9/1999 | Krause | |
| 7,062,514 B2 | 6/2006 | Harris | |
| 7,292,908 B2 | 11/2007 | Borne et al. | |
| 7,409,392 B2 | 8/2008 | Greer et al. | |
| 7,756,883 B2 | 7/2010 | Chien et al. | |
| 7,880,620 B2 | 2/2011 | Hatori et al. | |
| 8,351,657 B2 | 1/2013 | Makela et al. | |
| 8,788,590 B2 | 7/2014 | Culver et al. | |

(Continued)

FOREIGN PATENT DOCUMENTS

| | | |
|---|---|---|
| CN | 107194831 | 6/2017 |
| GB | 2531732 | 10/2014 |
| KR | 2017KR-0036645 | 3/2017 |

*Primary Examiner* — Edwyn Labaze
(74) *Attorney, Agent, or Firm* — DeWitt LLP

(57) ABSTRACT

A computer-implemented construction management system for enabling the performance of work tasks conducted at a remote project site like a construction site is provided by the invention. The system comprises a data interface for providing a communication link between a remote computer device used by the field worker at the project site and a central computer located at a central hub. Scanning a scannable indicia posted at the project site by means, e.g., of a smart phone or tablet, a field worker may quickly and readily gain access via a plurality of graphical user interface screens in the associated software to an organized set of documents, information, and electronic images associated with project tasks to be conducted at the project site. The field worker may also report information back to the central hub concerning the state of the construction project or the project task undertaken at the project site by means of the graphical user interfaces in the software that enable him to enter written text information or upload photographs, videos, and documents from the project site.

9 Claims, 14 Drawing Sheets

(56) References Cited

U.S. PATENT DOCUMENTS

| | | | |
|---|---|---|---|
| 9,064,219 B2 | 1/2015 | Hall et al. | |
| 9,031,585 B2 | 5/2015 | Kahle et al. | |
| 9,424,545 B1* | 8/2016 | Lee | G06Q 10/063114 |
| 10,157,368 B2 | 12/2018 | Schimpf et al. | |
| 2007/0027732 A1 | 2/2007 | Hudgens | |
| 2010/0094670 A1 | 4/2010 | Talmor | |
| 2010/0174656 A1 | 7/2010 | Nolan | |
| 2012/0066019 A1* | 3/2012 | Hinshaw | G06Q 10/06 705/7.23 |
| 2013/0138606 A1* | 5/2013 | Kahle | G06Q 10/06 707/609 |
| 2014/0025675 A1 | 1/2014 | Pineau et al. | |
| 2014/0310132 A1 | 10/2014 | Culver et al. | |
| 2015/0169791 A1* | 6/2015 | Lavrov | H04L 67/36 703/1 |
| 2015/0198938 A1 | 7/2015 | Steele et al. | |
| 2016/0071059 A1 | 3/2016 | Petering et al. | |
| 2016/0224927 A1 | 8/2016 | Pettersson | |
| 2016/0316981 A1* | 11/2016 | Gatter | A47L 7/0004 |
| 2017/0230930 A1 | 8/2017 | Frey | |
| 2017/0278030 A1 | 9/2017 | Pettersson et al. | |
| 2019/0324613 A1* | 10/2019 | Jhawar | G06F 3/167 |

\* cited by examiner

| Build Tools | | | | |
|---|---|---|---|---|
| Dashboard | Project Poster | Projects Poster | | 46 |
| Communications | Edit View | Project Name | | |
| Tasks | PROTECT WITH PIN | INCLUDE PM CONTACT | Preview —112 | Print Poster —114 |
| Schedule | 1234 —52 | YES —50 | | |
| Documents | PUBLIC NOTE ON POSTER (MAX 120 CHARS) —116 | | | |
| | Close all windows and doors | | | |
| Photos | PRIVATE NOTE ON WEBSITE )MAX 120 CHARS) | | | |
| Weekly Reports | Please call project manager for needs —120 | —68 | | |
| Daily Logs | Show less settings | Subject of Document Collection | | |
| Drawings | Document Name | DOCUMENT DATE | | |
| | Floor Plan —70 | | | |
| Project Poster | Electrical Plan —72 | | | ⎫ |
| Budget | Floor Plans | 2019-09-11 | | ⎬ 66 |
| | Specifications —76 | | | ⎭ |
| Selections | Specifications | 2019-09-11 | | |
| Change Orders | Civil | | | |
| Financial | Survey | 2019-09-11 | | |
| | Unassigned | | | |
| Service | Permit —78 | 2019-09-11 | | |

Fig. 4

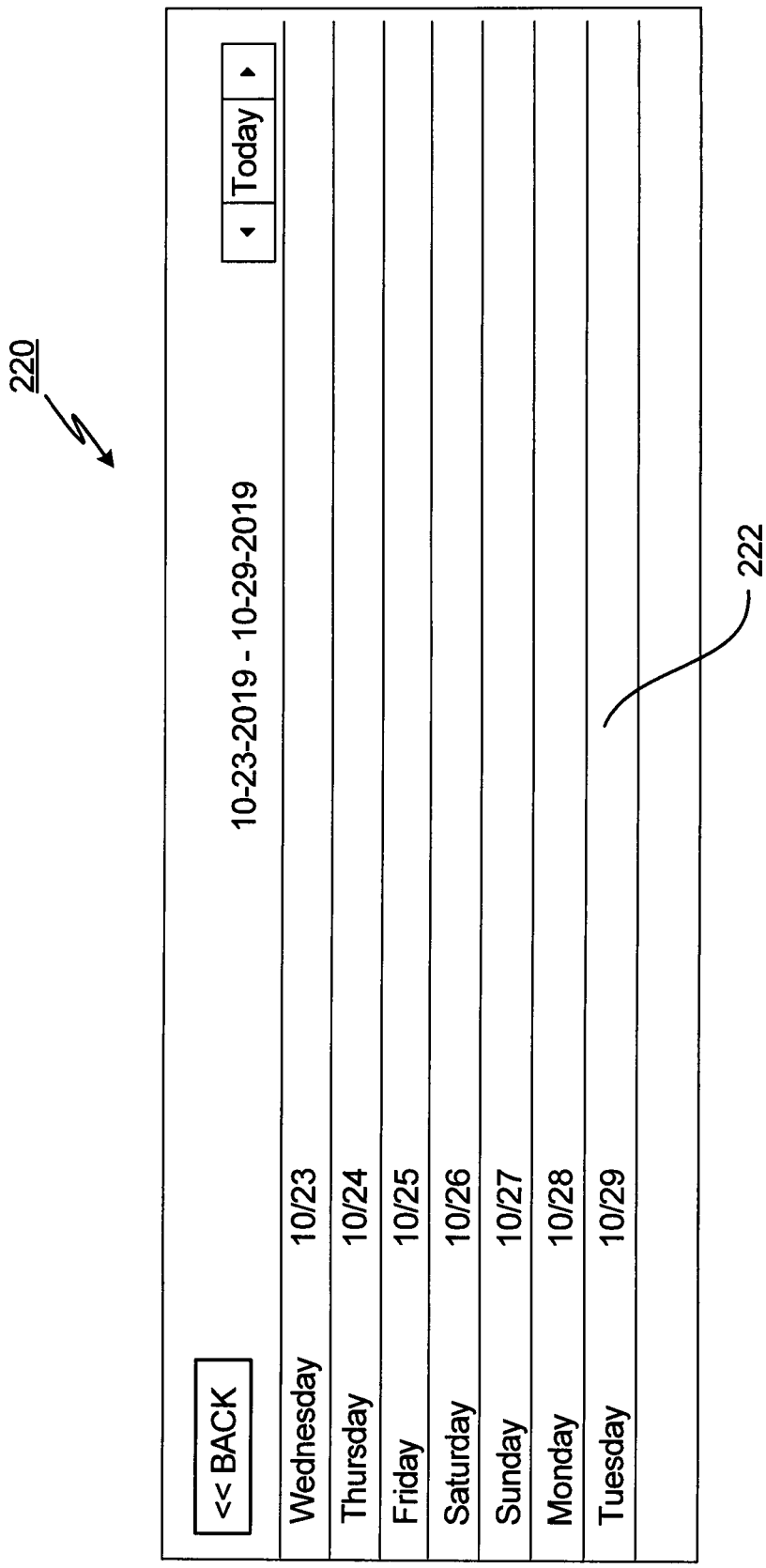

CONSTRUCTION PROJECT INFORMATION AND DOCUMENT ACCESS SYSTEM

FIELD OF THE INVENTION

This invention relates generally to information and knowledge sharing in a collaborative project environment, and more specifically to a system promoting collaborative work outcomes for permitting field workers to gather necessary information, documents, and instructions for individual project steps on an up-to-date basis, and gathering detailed information from installation workers in the field for exactly what was done during the project step in order to update the information and documentary record keeping for the project.

BACKGROUND OF THE INVENTION

Construction represents the process of assembling the parts of a building or infrastructure. It involves literally hundreds or thousands of different process steps conducted by a variety of laborers and skilled craft workers. Moreover, unlike manufacturing that involves the repeated mass production of similar items using the same process, construction usually involves a uniquely designed project that is built in accordance with a one-of-a-kind plan by a large number of people whose actions impact the actions required by other workers who are not accustomed to working with each other, and are unaware of the exact sequence for the interrelated work.

Building construction covers both residential and commercial structures. Infrastructure includes large public works, dams, bridges, highways, railways, water, wastewater, and utility distribution projects. Industrial construction encompasses refineries, process chemical, power generation, mills, and manufacturing plants.

At its heart, construction involves the translation of designs into reality. Design drawings and specifications are typically created by a design team that includes architects, civil engineers, mechanical engineers, chemical engineers, electrical engineers, structural engineers, a variety of technical consultants, and interior and exterior designers. While these skilled professionals are ultimately responsible for the design to produce a viable and aesthetically pleasing building or infrastructure suitable for its purpose that is also safe, regulatorily-compliant, and economically feasible to construct, a project manager in conjunction with an on-site construction manager, general contractors, unskilled laborers, and skilled craftsman like plumbers, electricians, HVAC installers, security and fire protection system installers, finish carpenters, etc. will actually assemble the project at the work site. They must be supervised to ensure that they are following the design drawings and specifications. But, they also must problem solve at the work site since reality may riot coincide with what is set forth within the drawings or specifications. Thus, what actually gets constructed may necessarily vary from what was planned. At the same time, the different process steps carried out by this array of laborers and craftsmen may need to follow a step-wise sequence. If one process step is conducted improperly or delayed in its installation, it may delay the next process step conducted by another worker that will lead to missed construction deadlines and cost overruns.

This environment for construction projects requires significant information sharing to increase the knowledge of all participants. Information regarding what is actually installed how and where at the project site should ideally be communicated by the field workers to the central office where the project manager, architect, and designers operate. Moreover, the field workers may require up-to-date information in real time at the project site that is necessary for them to complete their tasks, especially if the construction or design plans have been recently changed at the central office, or the reality at the project site differs from what is specified in the design or blueprint. Furthermore, the completion of a task by a field worker at the project site may create opportunities for other workers to commence their project tasks, or that field worker to assume responsibility for another project task. Effective management and distribution of the collective knowledge by the various project participants will decrease the time and increase cost efficiency of the overall construction project. These independent stakeholders need to share their data in a common, centralized information hub to obtain efficiencies that have eluded the architecture, engineering and construction ("AEC") industry for years. Current estimates indicate that $15 billion is wasted each year by construction inefficiencies.

Most previously existing systems within the construction industry for sharing project-related information is top-down with the information flowing from the project design team to others who need to access it for the project. For example, U.S. Pat. No. 5,950,206 issued to Krause discloses a document information database containing the drawings and other principal documents prepared by the architects for a building project. Contractors and subcontractors may search this database to gather the necessary information for preparing their cost bids for their relevant portion of the project. In this manner, a plumber or electrician can readily access the drawings and specifications directed to the plumbing or electrical work without having to sort through the entirety of the project documents.

U.S. Pat. No. 7,062,514 issued to Harris illustrates a networked system for construction project participants. The architect registers the project on an Internet site, and submits all of the material specifications for the project which are stored in a password-protected database. A contractor having the password is certified by the site, and then provided requested specifications via email so that he can submit his project proposal bid which is also stored in the website database. This system helps the architect or project owner to arrange the bid process as well.

Other computerized systems available within the construction industry provide collaboration tools for helping persons associated with a project to work together in its design, construction, or maintenance phases. A network-based computer system including at least one server and multiple clients in the form of architects, contractors, electricians, plumbers, painters, material supply firms, etc. to access the information that is stored on the server. See, e.g., U.S. Pat. No. 8,788,590 issued to Culver et al. and U.S. Published Application 2014/0310132 filed by Culver et al.

A common problem for construction projects is the need by the architects to modify the drawings while the building is being constructed. This creates the risk that contractors or subcontractors may be operating off of obsolete drawings. U.S. Pat. No. 8,351,657 issued to Makela et al. therefore teaches a computerized system for storing project drawings that verifies that a particular drawing in the database is the updated one.

Meanwhile, U.S. Published Application 2010/0094670 filed by Talmor discloses a data processing system for providing a working interface between the building contractor and a user. A plurality of construction plans from the contractor are converted. into objects shown on the computer screen. Changes made to the construction plans can be incorporated into the displayed objects. A subcontractor or the project owner can access the updated construction plans.

Another challenge is to manage the construction activities at a building project site where a number of different laborers and skilled craftsmen may be working side-by-side. They need to conduct their tasks without interfering with the other workers who are simultaneously carrying out their work tasks. Typically, the work day may start with a meeting of all the workers at the construction manager's office to go over their work tasks for that day. But while such face-to-face meetings may provide for efficient communication of information for these construction tasks and their staging at the project site throughout that day, such meetings do not permit the plans and tasks to be modified throughout the work day. Unlike unskilled laborers who typically are supervised at the construction site by a foreman, skilled craftsmen usually operate on their own at the construction site and therefore have an even greater need for information and guidance as their tasks need to compliment and not interfere with other activities at the construction site.

U.S. Pat. No. 9,424,545 issued to Lee shows a geospatial construction task management system comprising a smart phone or tablet computer deployed at the work site. The screen displays a geographic map of the project site with markers showing the scheduled activities by the various workers. The map can be searched by the general contractor by a specific time period to make sure that different scheduled tasks will not interfere with each other.

A need also arises, however, for information to be sent by the general contractor or workers or craftsmen at the project site to the project manager back in the central office. The project manager may not make visits to the project site, and will want to know the progress that has been made against the scheduled work tasks, including confirmations when the tasks have been completed.

U.S. Pat. No. 7,409,392 issued to Green et al. discloses a construction project management system into which data is entered to update the project completion status relative to the materials ordered, tasks performed, and inspections completed. This system enables the project manager to track the progress of the project at the work site, and to pay laborers for their work performed and subcontractors as they meet milestones under their contractors. See also U.S. Published Application 2014/0344181 filed by Brown for a construction trade building information management system that tracks contractors' progress, and the inventory of remaining construction materials on hand.

U.S. Published Application 2014/0025675 filed by Pineau et al. takes this a step further. A computerized system compiles, stores, and retrieves "as-built" drawings in a central location that depicts what is actually constructed at the project site. Such "as-built" drawings can be searched and retrieved by the central computer processing system. without fear that master drawings will get lost over time, or that the as-built drawings normally maintained by contractors and subcontractors become lost as well.

U.S. Published. Application 2016/0071059 filed by Petering et al. discloses a project management system useful for pipeline installations. The home office and workers at the project site are connected via a network system involving a central server. The home office can send maps, spreadsheets, and assignment sheets to the installation crews in the field, depicting where the pipeline should be installed. Meanwhile, the field crews can submit to the home office, via the central server, data from the project site, including how and where the pipe was actually laid. However, this appears to be merely an information collection system without any dynamic processing of the information to produce improved field maps and other guidance documents for assisting the field crews at the project site.

The day-to-day management of construction projects normally involves morning meetings at the central office where the project manager issues assignments for that day's project tasks for the general contractor, who will then relay specific assignments to individual workers or work crews at the project site. For smaller construction projects, the workers may participate directly in the morning assignment meetings held at the central office.

However, work assignments made at the beginning of the day may need to be modified during the day in response to unforeseen variables. For example, the project manager, architect, engineers, or designers may decide to make affirmative changes to the design with construction assignments having to be correspondingly modified. Construction materials may not be delivered to the project site on time. One work task at the project site may become delayed, thereby impeding the start of a second work task that is dependent upon the completion of the first work task.

U.S. Published Application 2010/0174656 tiled by Nolan seeks to address this problem by showing a computer-based system comprising a server having a punch list module. Such system creates and manages electronic punch lists that are transmitted to hand held computer devices maintained by, e.g., the general contractor at the work site. In this manner, assignments can be made and modified throughout the work day without the need for follow up meetings at the central office.

U.S. Published Application 2016/0224927 filed by Pettersson discloses another computerized system for providing a communication interface between a central server and remote devices maintained at the project site. It tries to transmit information more quickly to the work crews from the project manager at the central office. The work crews can take camera images of the work-in-progress at the project site, and send the images in conjunction with location tracking information via the communication network to the construction manager at the central office. In response, task lists can be prepared at the central office and transmitted to the workers at the project site.

Another challenge arises at project sites as workers encounter problems that were not anticipated by the blue prints and other design documents. These challenges are the norm in an AEC industry where design must survive the impact with reality. This could comprise, for example, misalignments in the design plans, or something previously installed that interferes with a second object that needs to be installed. While the general. contractor may halt a specific assigned work task in response to the problem until the matter can be discussed with the project manager at the next morning's central meeting, this is inefficient and will slow down the construction project. Moreover, the design planners may need to see specific information about the problem in order to produce a solution. Thus, U.S. Pat. No. 7,756,883 issued to Chien at al. discloses a computer- based system that allows the field workers to send photographs and videos concerning the problem encountered at the project site to the planners at the central office, who will view this information and communicate a decision. Such real-time trouble shooting enhances the construction process, but. can also slow down the process if the centralized decision makers are unavailable or take too much time to review the information sent by the field workers. Yet, speed to resolve open questions from the field workers is imperative as a construction project represents a chaotic environment with numerous changes to the physical environment occurring daily.

To the extent that any of these prior art systems enable a field worker at a project site to obtain construction or design information for the project, they are usually password protected to ensure security of the system and its information. This means that if the field worker does not have or remember his password, then he cannot access the system. Meanwhile, the project manager at the central office would need to assign and communicate passwords to hundreds or thousands of field workers like construction foremen, laborers, skilled contractors, etc. who might have a need to gain access to the system from the project site.

Another potential problem for the field worker is to wade through a large volume of information and documents stored inside the computerized system to examine and determine what he needs. Having been provided in advance with specific document numbers or file names will assist this determination. But without possession of such identifying information, it may be next to impossible for a field worker to retrieve the needed documents or information.

QR codes, RFID tags, and other scannable indicia have been used by industry to store information associated with a specific object. For example, the construction industry has affixed QR codes to construction materials to manage their inventory as they are shipped to the project site and installed within a building under construction. See, e.g., U.S. Published Application 2017/0230930 filed by Frey; and U.S. Pat. No. 7,292,908 issued to Borne et al.

U.S. Pat. No. 9,424,545 issued to Lee discloses a system in which a geographic map for the construction site may be communicated to a field worker via his mobile device like a smartphone or tablet computer including markers for project tasks under way, and showing objects that need to be installed. A computing device may scan a QR code to gain access to the project tasks. See also U.S. Pat. No. 10,157,368 issued to Schimpf et al.

Another potential problem is posed by the shear magnitude of the information or documents stored within the system for the construction project. Thus, U.S. Published Application 2007/0027732 filed by Hudgens shows an elaborate construction management system that discloses to a field worker at the project site only the necessary information needed by that worker based upon his identity, phase of the construction project, status of the tasks assigned to him, and his location at the project site. But such a system requires a large amount of coding of information and sensors located at the project site for detecting the worker's identity, location, etc.

Other construction project systems attach RFID tags to construction materials to provide necessary information to a worker at the site for those materials. See, e.g., U.S. Published Application 2017/0278030 filed by Pettersson; U.S. Published Application 2015/0198938 filed by Steele et al.; and U.S. Pat. No. 7,880,620 issued to Hatori et al. But such systems require a large number of RFID tags and are limited by the worker's accessibility to the construction materials, themselves.

Other construction project systems provide computerized systems that contain details of where equipment installed within a building under construction has actually been installed, Sometimes, locations for equipment must change from what was originally specified in blueprints due to the realities of the construction process conducted at the project site. See, e.g., U.S. Pat. No. 9,064,219 issued to Hall et al.; and U.S. Pat. No. 9,031,585 issued to Kable et al. To this end, Chinese Application No. CN107194831 filed by Bai et al. covers a construction management system that allows workers to modify the documents to memorialize those changes at the project site using a barcode scheme. This information is very helpful for maintenance workers performing their duties after the building has been constructed.

UK Patent Application 2,531,732 and South Korean Application 2017KR-0036645 filed by Kim disclose computerized systems employing QR codes at the construction site that are linked to specific construction drawings and other documents. However, these systems require not only a large number of QR codes to cover all of the drawings and other documents for the construction project, but also some kind of means like a. binder located at the work site for the field worker to look up the QR code associated with the specific drawing or document of interest before they may be scanned and accessed from the system.

However, none of these computerized systems for construction project management provide ready access by a field worker to needed information and documents for a specific project task without complicated password security protocols and the need to search through a large number of stored documents and information for the overall project, or a large number of QR codes, RFID tags, barcodes, etc. associated with such documents and information files in order to identify and gain access to the needed information or documents. It would be beneficial to provide a scannable indicia like a QR code, RFID tag, barcode, etc. associated with, e.g., a specific room of a building under construction to provide a field worker access to an organized set of files containing information and documents related to the construction project tasks to be completed in that room. Moreover, it would be helpful for the construction management system operating on the basis of such scannable indicia to additionally allow the field worker to supply information regarding a partially or completed project task to be communicated back to the central office. The project manager, architects, designers, etc. may then follow up upon this information provided by the field worker to update project drawings, information databases, project task lists, etc.

SUMMARY OF THE INVENTION

A computer-implemented construction management system for enabling the performance of work tasks conducted at a remote project site like a construction site is provided by the invention. The system comprises a data interface for providing a communication link between a remote computer device used by the field worker at the project site and a central computer located at a central hub. The field worker may also report information back to the central hub concerning the state of the construction project or the project task undertaken at the project site by means of the graphical user interfaces in the software that enable him. to enter written text information or upload photographs, videos, and documents from the project site. This information is then processed by the project manager, architect, designers, or other. staff at the central hub to update project drawings, project design information, task lists for the field workers, scheduling materials to be sent to the project site, etc.

Scanning a scannable indicia posted at the project site by means, e.g., of a smart phone or tablet, a field worker may quickly and readily gain access via a plurality of graphical user interface screens in the associated software to an organized set of documents and information associated with project tasks to be conducted at the project site. For example, the posted scannable indicia may be associated with a particular room in the building under construction whereby the organized set of documents and information associated with that scannable indicia are relevant to the project tasks to be undertaken by field workers in that room. The field worker at the project site may also accompany his data message with a specific action item associated with the completed work task that should be followed-up upon by the central hub. This functionality enables the central hub to manually or automatically follow up upon the required action item without the message getting lost amongst the large number of other data messages coming into the central hub.

The construction management system greatly enhances the flow of information between the planners and managers located at the central hub and the field workers performing the work tasks at the remote project site to increase the efficiency and speed of the project. But, it also creates a common knowledge base that creates cross-organizational knowledge for the processed data obtained from the project site across the broader coordinated galaxy of persons and parties associated with the work project—namely the owners, architects, designers, engineers, consultants, contractors, unskilled laborers, skilled craftsmen, etc. associated with the project. By breaking down the silos which frequently exist around these persons and functionalities, enhanced teamwork and successful results will be accomplished for the project.

BRIEF DESCRIPTION OF THE DRAWINGS

FIG. 4 is a graphical user interface used by the central office to produce the poster containing a scannable indicia for the work project or room or work task associated with the project, and then the association of an organized set of files containing documents, information, and electronic images associated with that scannable indicia for the benefit of the field worker.

FIGS. 11-14 represents GUI screen shots for the further actions taken by the field worker off the GUI of FIG. 10.

DETAILED DESCRIPTION OF THE PREFERRED EMBODIMENT

Figure 1:
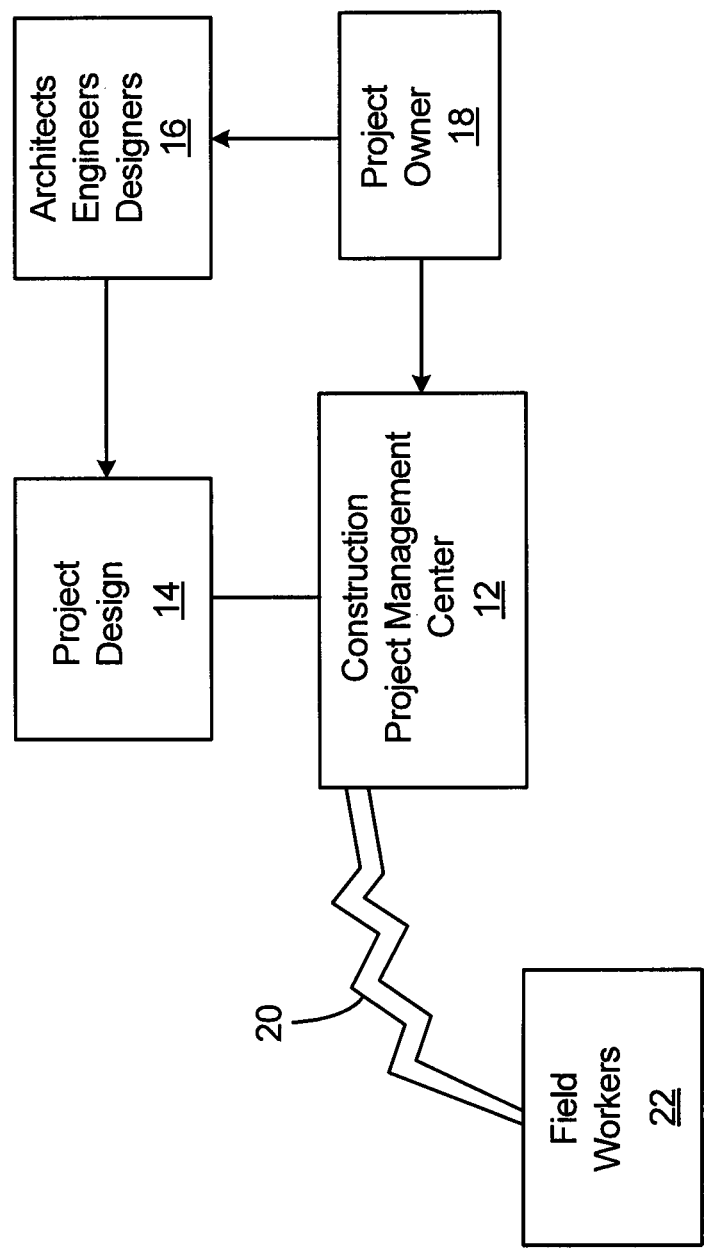
FIG. 1 is a schematic illustration of the surrounding environment of the construction management system of the present invention.

A computer-implemented construction management system for enabling the performance of work tasks conducted at a remote project site like a construction site is provided by the invention. The system comprises a data interface for providing a communication link between a remote computer device used by the field worker at the project site and a central computer located at a central hub. Scanning a scannable indicia posted at the project site by means, e.g., of a smart phone or tablet, a field worker may quickly and readily gain access via a plurality of graphical user interface screens in the associated software to an organized set of documents, information, and electronic images associated with project tasks to be conducted at the project site. For example, the posted scannable indicia may be associated with a particular room in the building under construction whereby the organized set of documents and information associated with that scannable indicia are relevant to the project tasks to be undertaken by field workers in that room. The field worker may also report information back to the central hub concerning the state of the construction project or the project task undertaken at the project site by means of the graphical user interfaces in the software that enable him to enter written text information or upload photographs, videos, and documents from the project site. This information is then processed by the project manager, architect, designers, or other staff at the central hub to update project drawings, project design information, task lists for the field workers, scheduling materials to be sent to the project site, etc.

In the context of the present application, "work project" means any project for the construction, installation, or production of an object or an end product involving multiple process steps, including but not limited to, a residential, business, or industrial building; a roadway, bridge, dam, or other civil engineering project; electrical, plumbing, HVAC, or stonework, tile, or finish carpentry project, skilled subportions of any construction project; underground or overhead wiring for a telecommunications installation and all equipment therefore; drilling equipment, refinery, plants, and pipelines for the oil and gas industry; airports, wastewater treatment, water, sewer, or storm sewer infrastructure operated by municipalities; and film production studio.

For purposes of the present invention, "work or project task" means any discrete construction, installation, or production process step carried out by a skilled or unskilled worker for a work project.

As used in this application, "project site" means the location where the subject of a work project is being constructed, installed, or produced, usually remote from the central office of the company that is responsible for the work project.

For purposes of the present invention, "field worker" means a skilled or unskilled employee, contractor, or subcontractor performing the work task at the project site.

In the context of the present application, "scannable indicia" means any machine-readable optical or electromagnetic-based label that contains information for linking a field worker to an organized set of drawings, data, photographic, and other files and images related to a construction work project or work tasks associated with a particular portion of a construction work project via the construction management system of the present invention. Such scannable indicia may include without limitation, QR codes, barcodes, MD tags, a custom scannable logo that works in a similar manner to a QR code, near-field communication ("NFC") protocols or other low or no-power frequencies that identify a user's location. It could also comprise a "beacon" placed at the project site that forces a pop-up screen on the user's mobile device when it is within range.

The construction management system 10 of the present invention is depicted in FIG. 1. A construction project management center 12 is operated by a company or individual person for purposes of the work project—also known as the "construction manager." The construction manager 12 will construct, install, or produce the work project in accordance with a project design 14 often in the form of drawings, specifications, material lists, work task lists, project budget etc. One or more persons 16 including architects, engineers, design experts, consultants, etc. ("stakeholders"), are responsible for developing the project design 14, depending upon the nature of the work project. The owner of the work project 18 has commissioned the design, construction, installation, and production of the work project, usually paying for the work.

The construction project manager 12 has an interface 20 for communicating with or directing the work tasks of the field workers 22 who actually construct, install, or produce the work project. Such field workers can comprise unskilled laborers like framers and roofers. They can also comprise skilled craftsman like electrician, plumbers, HVAC installers, fire monitoring and suppression system installers, security system installers, drywallers, finish carpenters, stone masons, tile installers, etc. The unskilled laborers are generally supervised by a foreman. A general contractor may or may not be present who can answer questions posed by the skilled craftsmen. While communications may occur in-person or via conventional electronic means such as by telephone, email, facsimiles, letters or other paper documents, for purposes of the present invention such interface 20 comprises the transmission of data and written or verbal communications via a computer-based network.

Figure 2:
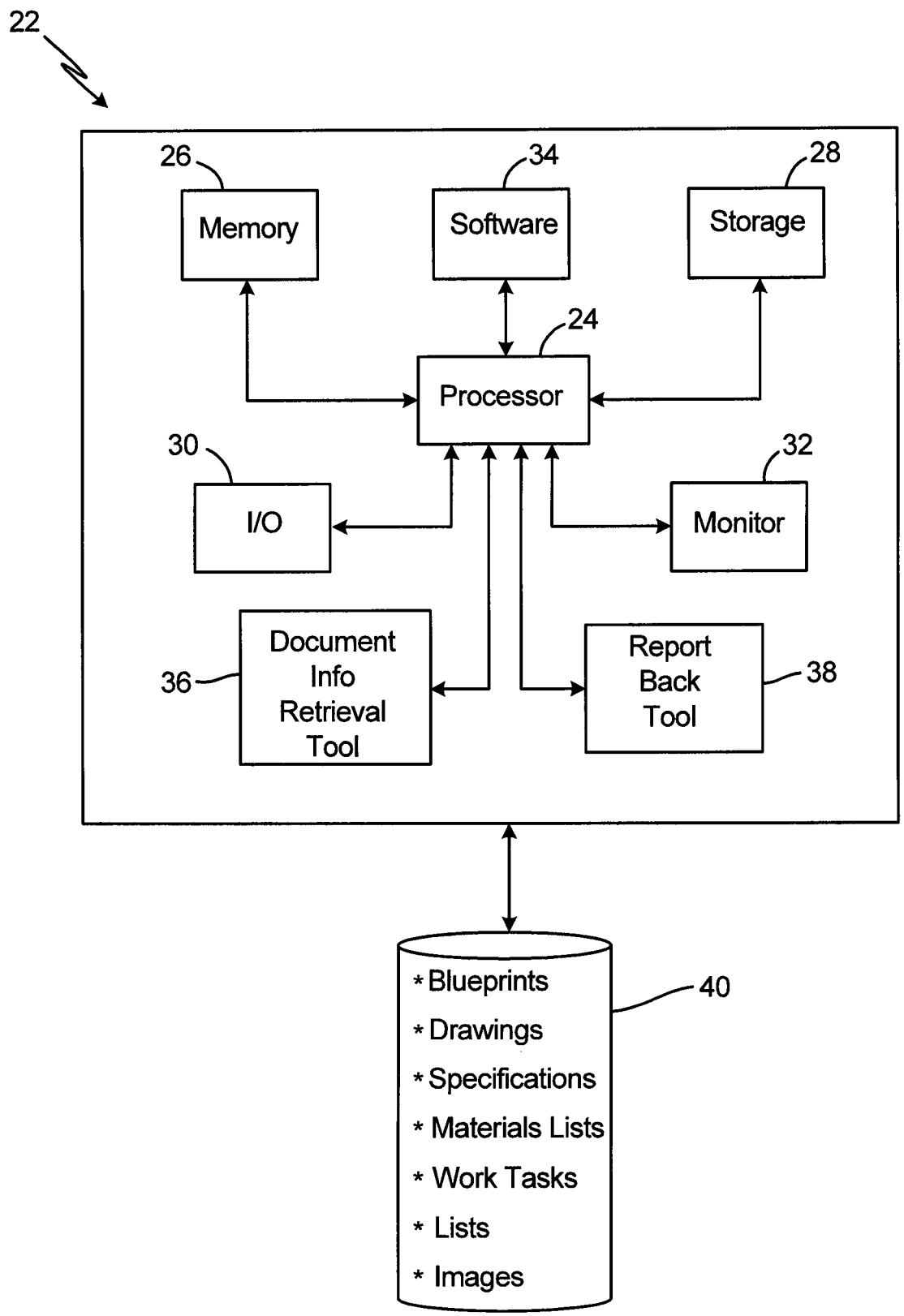
FIG. 2 is a schematic illustration of the computer embodiment of the construction management system.

Referring to the exemplary embodiment of FIG. 2, the knowledge management system 10 comprises a general programmable computer 22 having a central processing unit ("CPU") 24, controlling a memory unit 26, a storage unit 28, an input/output ("I/O") control unit 30, and at least one monitor 32. Computer 22 operatively connects to database 40, containing, e.g., blueprints and other drawings and specifications for the project design; materials lists; a multitude of work tasks staged in a logically sequenced manner; lists of suppliers, vendors, general contractors, skilled craftsmen, architects, engineers, and designers—complete with telephonic, address, and email contact information for these persons; and project budget documents. It also operatively connects to the Document/Information Retrieval Tool 36 and the Report-Back Tool 38, that will be described more fully herein. Computer 22 may also include clock circuitry, a data interface, a network controller, and an internal bus. One skilled in the art will. recognize that other peripheral components such as printers, drives, keyboards, mousses, and the like can also be used in conjunction with the programmable computer 22, Additionally, one skilled in the art will recognize that the programmable computer 22 can utilize known hardware, software, and the like configurations of varying computer components to optimize the storage and manipulation of the data and other information contained within the automated knowledge management system 10.

The software program 34 may be designed to be an expression of an organized set of instructions in a coded language. These instructions are programmed to facilitate the intake of harvest information and queries from the field workers at the work site, and outflow of processed harvest information to the field workers, project design team members, and subsequent work tasks pushed to or pulled by the field workers at the site.

The computer system on which the system resides may be a standard PC, laptop, mainframe, handheld wireless device, or any automated data processing equipment capable of running software for monitoring the progress of the transplantable material. The CPU controls the computer system and is capable of running the system stored in memory. The memory may include, for example, internal memory such RAM and/or ROM, external memory such as CD-ROMs, DVDs, flash drives, or any currently existing or future data storage means. The clock circuit may include any type of circuitry capable of generating information indicating the present time and/or date. The clock circuitry may also be capable of being programmed to count down a predetermined or set amount of time.

The data interface allows for communication between one or more networks which may be a LAN (local area network), WAN (wide area network), or any type of network that links each party handling the claim. Different computer systems such as, for example, a laptop and a wireless device typically use different protocols (i.e., different languages). To allow the disparate devices to communicate, the data interface may include or interact with a data conversion program or device to exchange the data. The data interface may also allow disparate devices to communicate through a Public Switched Telephone Network (PSTN), the Internet, and private or semi-private networks. Referring to FIG. 2, knowledge management system 10 includes a software program 34 having a plurality of graphic user interfaces ("GUIs") that are displayed to a user in a text or graphical form to permit the input of data or queries concerning completed or pending work tasks at the work site, and the outflow of updated work tasks, and answers to those submitted queries. The GUI can also be used to display the status of the work tasks to the construction manager, design team members, and project owner, as well as the relevant field workers. The software program 34 can also produce and print a series of reports documenting this information.

One of the principal advantages of the construction management system 10 of the present invention is that data and information may be sent to and received from the construction management system 10 by the field worker 22 by means of a tablet computer like an Apple iPad® or a Smart phone like an Apple iPhone® or a Samsung Galaxy®. These computer devices are used widely by persons in the world. Thus, they are familiar devices that are easy to navigate and manipulate via their intuitive software programs that operate the hardware contained therein. The invention is built on a progressive web app architecture allowing for minimal storage and CPU usage on the client device with the majority of the information and data processing taking place on the centralized servers, or in the "cloud."

Figure 3:
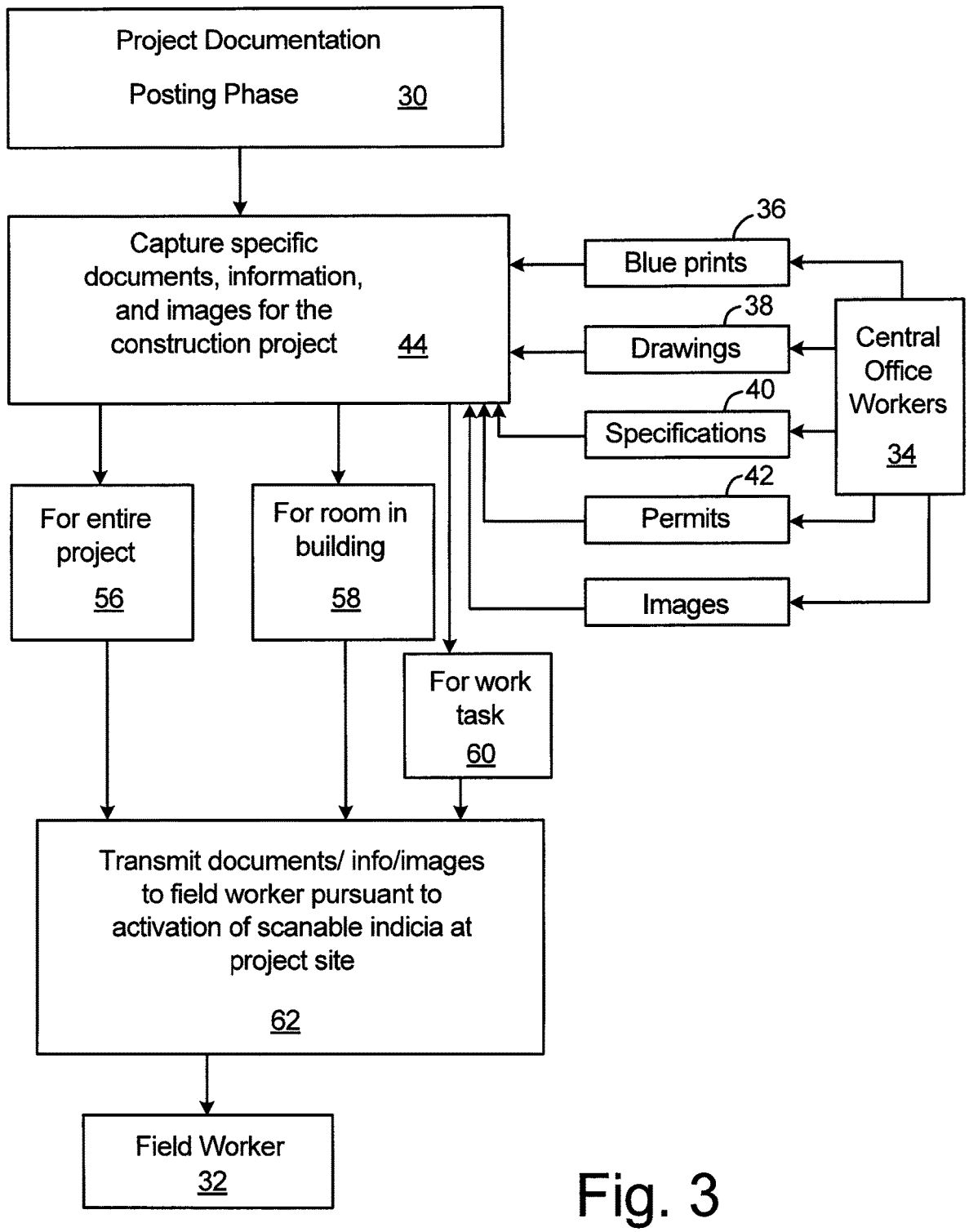
FIG. 3 is a flow diagram illustrating the "project documentation posting phase" by the central office for the construction management system, and the transmission of this information, documents, and electronic images to the field worker.

The construction management system 10 contains a series of graphical user interface ("GUI") screens. FIG. 3 comprises a schematic diagram depicting the project documentation posting phase portion 30 of the construction management system 10 in which one or more documents or electronic files containing relevant information is collected (44) for purposes of making it available remotely to a field worker 32 upon request. This is useful to the work project, because the field worker 32 can obtain up-to-date drawings, specifications, and other relevant information for a project task that he is to undertake at the project site. Such information may answer questions concerning, or otherwise clarifying, the project task for the benefit of the field worker. It also saves the need for the field worker to bring the documents and other information with him to the project site. Just as importantly, providing remote access to these documents and information to the field worker at the project site enables the project manager, architect, designers, and other central office functionaries to modify, update, or clarify the information contained in the project documents, specifications, and other information files without leaving the field workers who perform a work task impacted by such modifications or updates out of the loop.

Construction projects are complicated affairs with multiple persons having input in the form of architects, engineers, designers, etc. and while multiple other persons in the form of laborers, electricians, plumbers, HVAC installers, security system installers, finish carpenters, and other skilled craftsmen must carry out specific project tasks in compliance with this document and information to construct the building. Some of these field workers may meet with the project manager at the beginning of the day to review the work tasks and how they may need to be coordinated. But not all such field workers will generally participate in these meetings at the central office. Moreover, changes may need to be made to the project plan and design documents and specifications during the course of the work day. The construction management system 10 of the present invention enables the field worker to remotely access this up-to-date information and documents at the project site in order to ensure proper installation of construction materials for a project task. This avoids mistakes and the need for the work under the project task to be redone.

Under the project documentation posting phase 30, specific documents and information relevant to the construction project are identified, collected, and captured. This is done within the central office 34. Blue prints 36, drawings 38, specifications 40, permits 42, and other information for the project are captured in an electronic file format, such as pdf files, jpeg files, CAD files, Word files, Excel spreadsheet files, or other applicable electronic file formats. The objects may also comprise other non-documentary images like photographs and videos. These electronic document, information, and image files are stored in a database 44 associated with the construction project management system 10.

FIG. 4 shows a GUI screen 46 for the software associated with the construction project management system used by central office personnel 34 to store and organize the electronic files for a construction project. The name of the construction project is entered into field 48. The name and a telephone number and/or email address for the project manager may be entered into field 50. If a password or other form of personal identification number ("PIN") for the project is desired for security protection, then it will be entered into field 52.

Turning back to FIG. 3, an important feature of the construction project management system 10 is that the electronic document, information, and image files for the project may be organized by different granularities. For example, electronic tiles for the entire project (56) like a house under construction may be stored together in the same portion of the database. Alternatively, just the electronic files for a particular room like the kitchen in the building under construction (58) may be stored together in a portion of the database. Or just electronic files for a particular object in the room like a stove or oven may be stored together in a portion of the database. Still alternatively, just the electronic files for a particular work task for the construction project, or for a particular work task to he conducted within a specific room of the building under construction (60) may be stored together in a portion of the database. In this manner, a field worker 32 at the project site may more easily find the documents and information that he needs that are relevant to the work task that he is to conduct at the project site. He is permitted pursuant to the construction project management system to choose the document or information files that he needs, and have them transmitted to his mobile device such as a Smart phone or tablet computer (62).

The GUI screen 46 of FIG. 4 contains a field 66 that contains a listing of electronic files that have been stored in the database for purposes of the entire project 56, room or object in the building under construction 58, or specific work task 60 pursuant to the construction project or room in the building under construction 60, which in turn is entered for identification purposes into field 68. For example, these electronic files could include a floor plan 70 for the building, portion of the building, or room in. the building. Likewise, it could include electrical plans 72 in the form of electrical layout diagrams, materials lists for the electrical devices to be installed, and specific specifications or instructions for their installation. It could also include plumbing plans 74 in the form of plumbing layout diagrams, materials lists for the piping, connectors, valves, etc. that are to be installed, and specific specifications or instructions for their installation. It could also include specifications files 76 that provide critical information and necessary standards and tolerances for the work to be conducted for a project task. An electronic file containing a copy of the necessary permits 78 for the work project may also be included. Many other types of documents, information and images like photographs and videos relevant to the work tasks to be conducted in the building or room in the building are possible for inclusion in GUI 46. As long as they are relevant to the project work tasks, then their inclusion will be beneficial to the field workers 32 who may need remote access to the documents, information, and images in order to conduct their assigned work tasks at the project site in an accurate manner with the design plans for the construction project.

Figure 5:
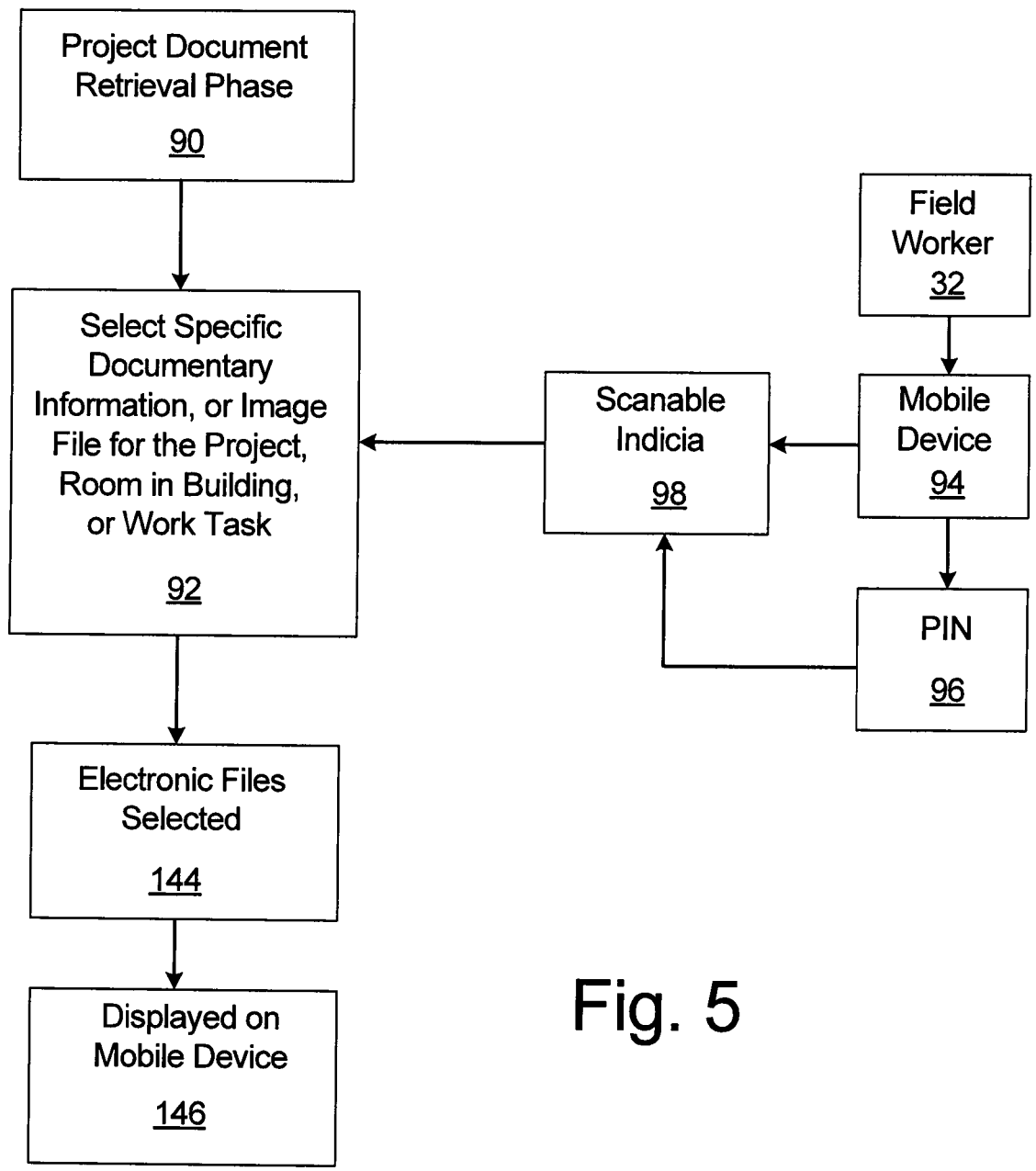
FIG. 5 is a flow diagram illustrating the "project document retrieval phase" used by the field worker to pull documents, information, and electronic images via the scannable image for his work task.

The process for the project document retrieval phase 90 of the construction project management system 10 is depicted in FIG. 5. A field worker 32 like a construction foreman, laborer, or skilled craftsman will use a computer device 94 that is preferably a mobile device like a Smart phone or tablet computer. This mobile device 94 communicates with the server of the construction management system 10 via a hard wired connection or a wireless link. A personal information number ("PIN") or password 96 may need to be entered by the field worker for security purposes to access the construction project management system 10. But because the construction project site, itself, may be secured, such as a building under construction that is locked or a fenced project site, the PIN or password protection may be dispensed with because the field workers by definition cannot gain access to the project site unless they are part of the team of workers properly associated with the construction project.

Unlike other systems employed in the construction industry where the field worker, after gaining access to the system, must wade through endless lists of electronic files to find the specific files of interest, the construction project management system 10 of the present invention uses a scannable indicia 98 as the point of entry into the project document, information, and electronic image retrieval tool 90.

Figure 7:
FIG. 7 represents the scannable indicia in the form of a QR code.

Many different types of scannable indicia 98 are possible for purposes of the present invention. For example, a Quick Response Code ("QR Code") 100 represents a matrix barcode (i.e., two-dimensional barcode) that uses four standardized encoding modes (numeric, alpha numeric, byte/binary, and kanji) to store data efficiently. The QR Code shown in FIG. 7 consists of black squares arranged in a square grid on a white background. It is machine read by an optical scanner like a camera and processed using Reed-Solomon error correction to properly interpret the image and extract the information from the patterns that are present in both horizontal and vertical components of the image for a particular item or object to which the QR Code is associated.

Figure 8:
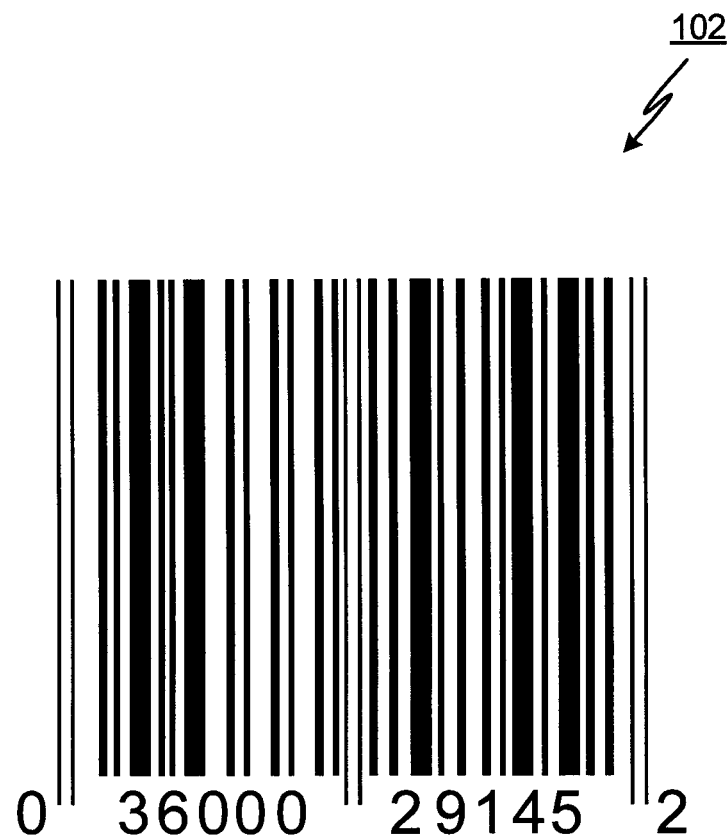
FIG. 8 represents the scannable indicia in the form of a bar code.

Alternatively, the scannable indicia 98 may comprise a barcode 102 like the one shown in FIG. 8. Such a barcode comprises a one-dimensional series of parallel lines of varying widths and spacings. They are machine read (scanned) by an optical scanner that deconstructs and interprets the pattern of spaced lines and their gaps to extract the information for an item or object to which the barcode is associated.

Smart phones and table computers commonly contain cameras along with associated software for scanning and interpreting optical images. Therefore, QR Codes 100 and barcodes 102 comprise useful scannable india 98 for purposes of the construction project management system 10 of the present invention. But the scannable india 98 may alternatively comprise a radio-frequency identification ("RFD") tag 104, Such RFID tags contain electronically stored information for an associated item or object. They are identified by means of a nearby MD reader using interrogating radio waves forming an electromagnetic field. Passive RFID tags collect energy from the interrogating radio waves, while active RFID tags utilize a local power source like a battery for longer-range scanning. Unlike a QR Code or barcode, a RFID tag 104 does not need to be within the line of sight of the reader.

Figure 6:
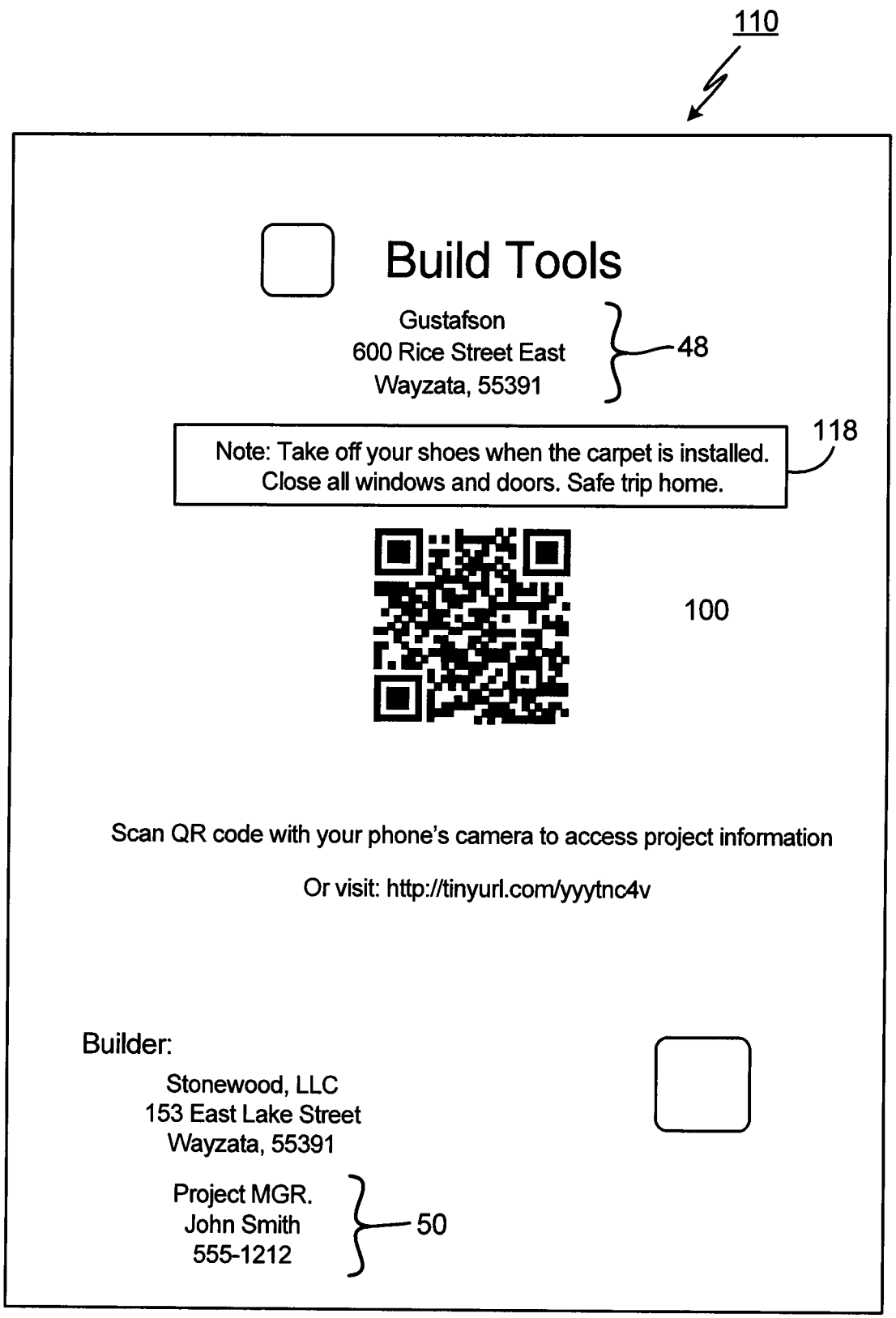
FIG. 6 represents the poster containing the scannable indicia for the work project.

FIG. 6 shows a poster 110 containing a QR Code 100 for the construction project. While it may be associated with the entire scope of the construction project, it more preferably is associated with a particular room of the construction project, and therefore may be posted on the wall of that room. More preferably, the room might have posted on its walls a plurality of such posters 110, each bearing its own unique QR Code 100, for different work tasks or groups of work tasks (e.g., electrical, plumbing, heating and cooling and other mechanicals, finish carpentry) to be conducted by field workers in that room, and labeled as such on their respective posters 110. For example, separate posters 110 could be placed on or near where cabinets, ovens, stoves, and a dishwasher are to be installed in a kitchen. Or else, separate posters could be placed on a furnace that needs to be installed or serviced.

Turning back to FIG. 4, the "preview" button 112 on the GUI screen 46 allows a central office worker 34 to examine the content of the poster 110 produced for the construction project, building room, or work tasks using the information entered into the fields of the GUI screen, and the QR Code 100 to be generated therefore. "Print Poster" button 114 is used by the central office worker to produce the printed poster 110, itself. Special notifications to be provided to the field workers working in the room may be entered into field 116 which will then be printed onto the poster (118) A private notification for the field workers to be printed onto the website may be entered by the central office worker into field 120 in GUI screen 46 and might include, e.g., "Please turn off the lights and lock the doors When you leave the room or building" or "Call John Smith at 555-1212 if you need further information."

Figure 9:
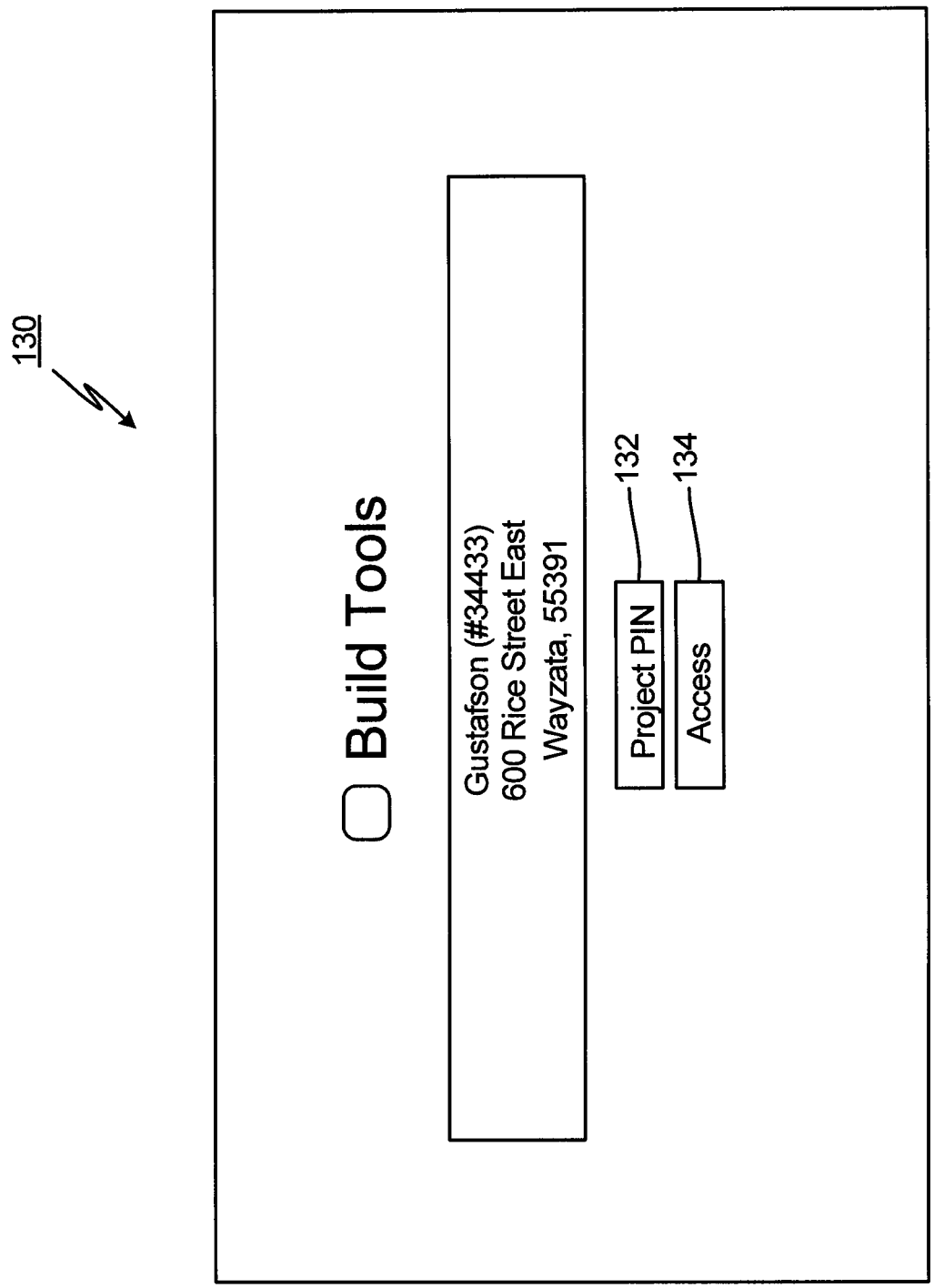
FIG. 9 represents a screen shot of the project PIN GUI used by the field worker to securely access the construction management system.

The GUI screen 130 shown in FIG. 9 provides the field worker 32 the opportunity to enter his PIN or password into field 132 where such a PIN or password is required for access to the construction project management system 10. Pressing the "access" button 134 will then bring the field worker 34 to GUI screen 140 shown in FIG. 10.

GUI screen 140 contains the same list of electronic files for the construction. project, building room, or work tasks that were stored by the central office 34 in association with QR Code 100. Such electronic files which, for example, may include floor plans 70, electrical plans 72, plumbing plans 74, specifications 76, permits 78, photographic or video images, etc., are clearly identified for the benefit of the field worker 32. Pushing electrical plans button 72, for example, may provide a single document file that is relevant to the electrical plans for the work tasks for the project or portion of the project associated with QR Code 100. It may also produce a drop down menu where two or more document, information, or electronic image files relevant to the electrical plans were stored. In this manner, the field worker 32 may readily access (142) and have displayed on his Smart phone or tablet computer (144) the document, information, or electronic image files that he selects. Because the QR Code 100 that he scanned is associated with the subset of document, information, or electronic image files most pertinent to the room of the building in which he is working or even the specific work task that he is conducting, he can access the documents, information, or electronic image that he chooses quickly and without confusion.

Figure 10:
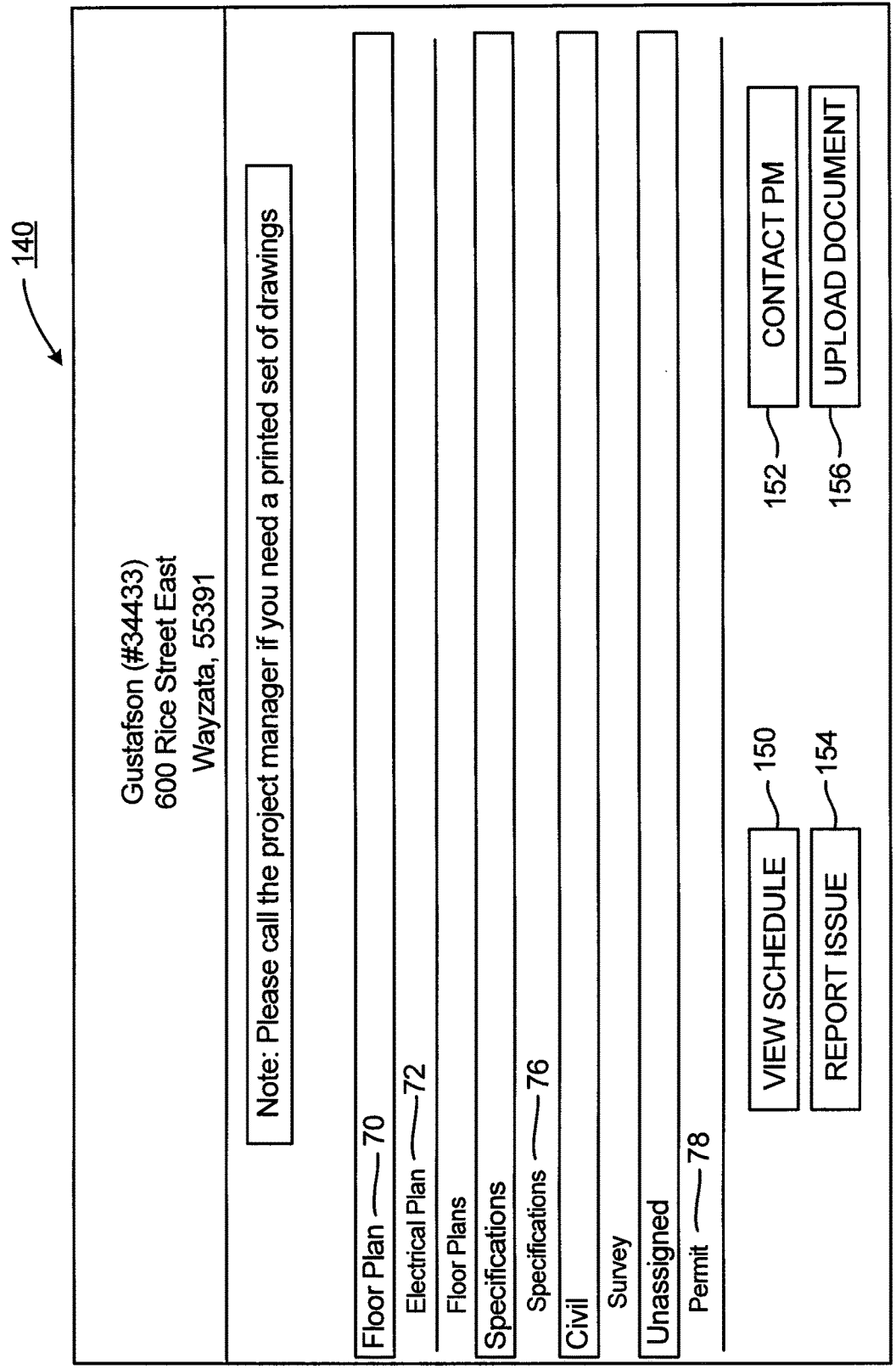
FIG. 10 represents a screen shot of the GUI accessed by the field worker via the scannable indicia to pull transmission of documents, information, and electronic images to him at the project site, and to take further actions with respect to the work project.

GUI 140 shown in FIG. 10 also enables the field worker to interact with the central office 34. Pushing "view schedule" button 150 will display on the field worker's Smart phone or tablet computer a list of work tasks that have been scheduled by the central office to take place in the building or room associated with the QR Code 100 on that day or another day. This allows the field worker to coordinate his work tasks with the work tasks to be undertaken by other field workers at the project site or within the same room so that they do not interfere with each other's tasks. It also allows the field worker to determine whether he needs to complete his work task by a specific time to accommodate another field worker whose assigned task is dependent upon the first field worker completing his work task.

Figure 11:
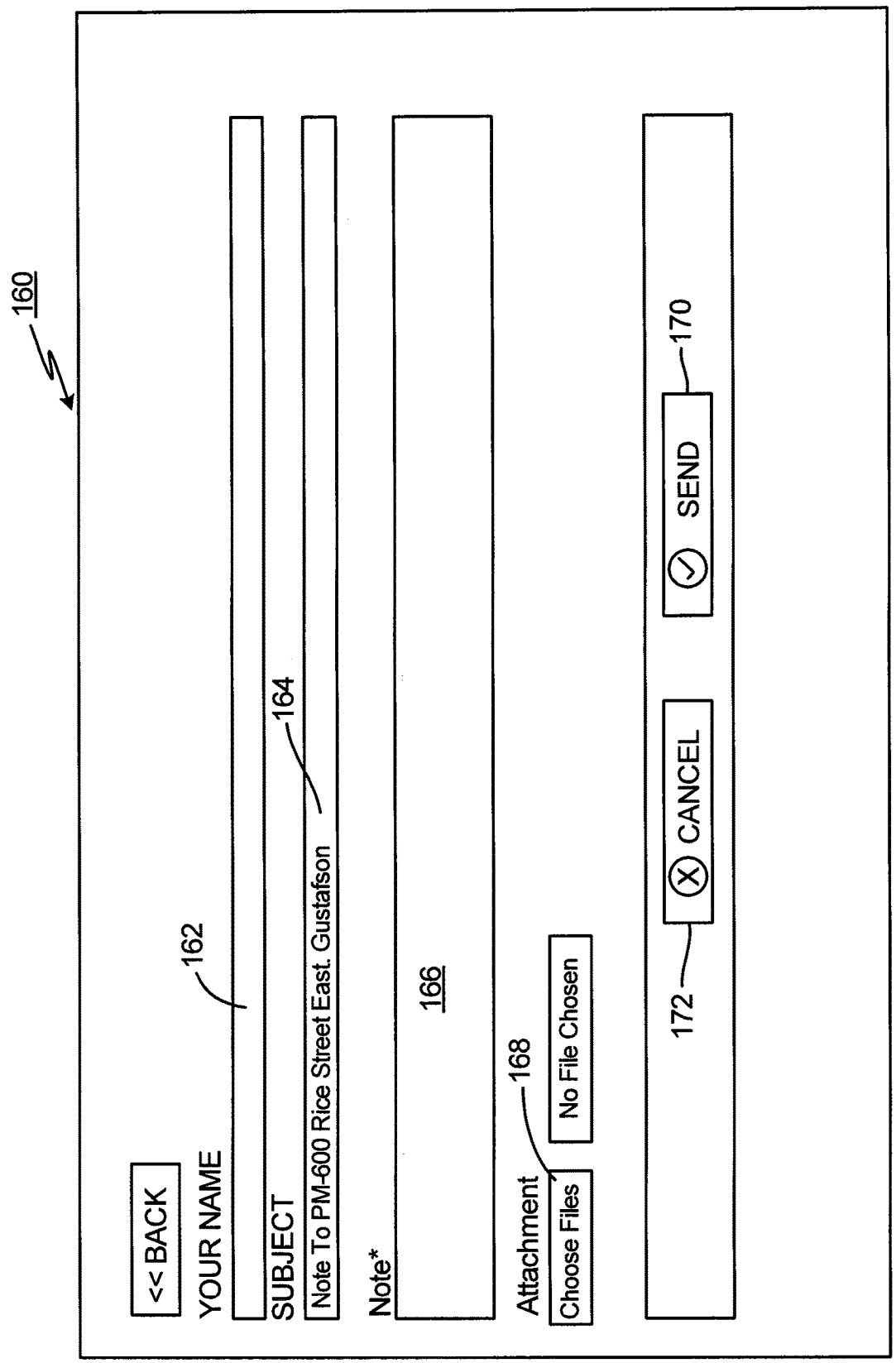

Pressing button 152 allows the field worker to contact the project manager back at the central office. The field worker's Smart phone can automatically call the project manager or prompt a call back by the project manager to the field worker's Smart phone or tablet computer (e.g., for a video chat). Alternatively, pressing button 152 can direct the field worker to the GUI 160 shown in FIG. 11. The field worker may enter his name in field 162. The subject field 164 is automatically generated by the software system to provide the project manager the identification of the "600 Rice Street East, Gustafson" house building project to which the field worker's question pertains. The field worker may then type text for his question into field 166. Finally, electronic files stored on the field worker's phone or tablet computer like a photograph or video may be attached to the message via "choose files" button 168. The field worker presses "send" button 170 to transmit his question to the project manager which will prompt a response. "Cancel" button 172 allows the field worker to delete a message that he has started to prepare.

This "contact the project manager" function of the software system is helpful if the field worker has a question about how properly to complete his assigned work task prompted by something that he has discovered at the work site. By having such questions answered directly, the field worker may carry out his work tasks more efficiently. The project manager may also determine whether he needs to get another manager involved to address or follow up upon the issues raised by the field worker's question.

Button 154 allows the field worker to report back to the central office a particular issue arising from the work project conducted at the project site. For example, the field worker might report that he has fully completed his work task, so that the next sequential work task for that room in the building can be scheduled for that field worker or another field worker. Or the field worker might report to the central office that he does not have the necessary materials at the project site to undertake his work task. Or that previous work to be conducted by another field worker that is essential to his own work task has not been performed or completed. Likewise, the field worker might report that he had to deviate from the project plans in the conduct of his work task because of an unexpected condition found in the room at the project site (e.g., a mechanical device like duct work was installed in the wall or ceiling by another field worker where a plumbing line is supposed to be installed.)

Figure 12:
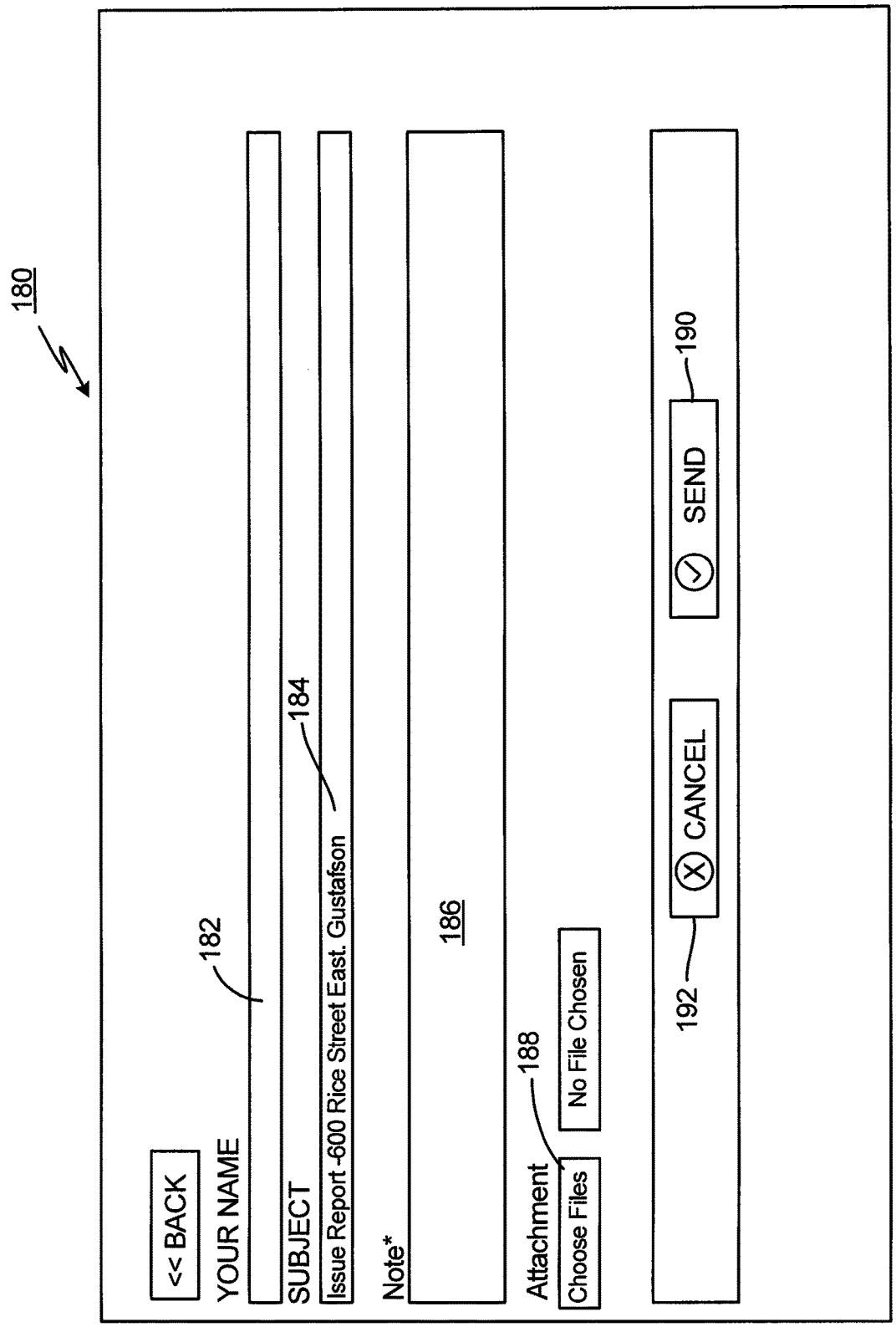

As shown in GUI 180 of FIG. 12, to which the field worker is directed when he presses button 154, the field worker may enter his name in field 182. Again, the software system will auto-complete subject field 184 to identify the project to which the reported issue pertains. The field worker may then type the content of his issue into field 186 and attach any explanatory image files like photographs or videos that are stored on his phone or tablet computer via "choose files" button 188. Pressing the "send" button 190 will transmit the message and its content back to the central office for further action, including updating design plans, changing future work tasks for the project, or scheduling necessary construction materials. Because the reported issue is associated with the scannable indicia 98 that was used by the field worker to gain access to the construction management system, the message will be associated by the system, to the project, room, object, or work task associated with that scannable indicia 98 to avoid confusion and accelerate corrective action by the central office.

Figure 13:
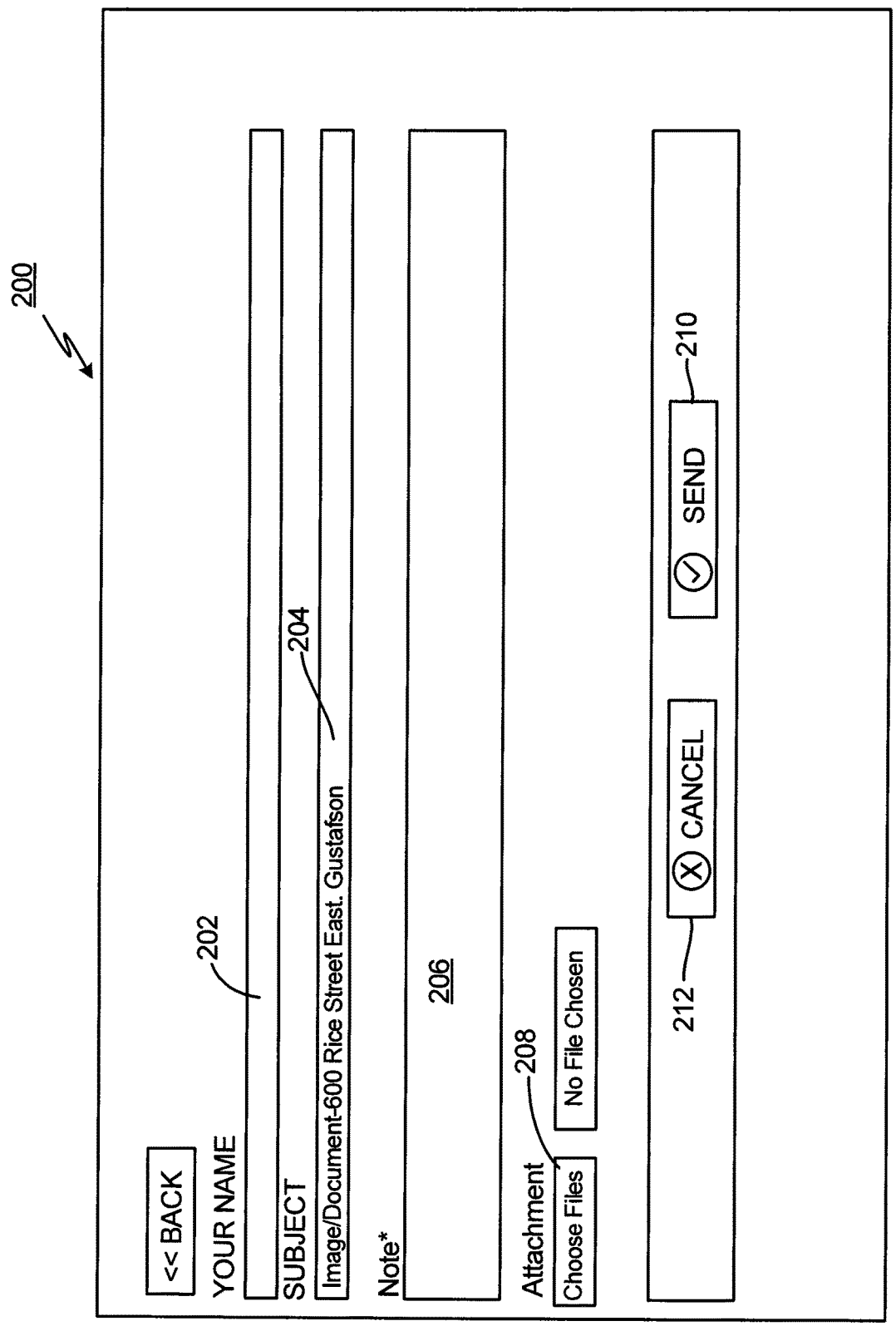

By pushing button 156 in GUI 140 of FIG. 10, the field worker may upload a document or electronic image like a photograph or video to send back to the central office. GUI screen 200 shown in FIG. 13 allows the field worker 32 to enter his name in field 202, with the subject matter for the document or image being auto-generated in field 204. An explanatory written message may be entered into field 206. An electronic file like a photograph or video of the work site issue taken by the Smart phone or tablet computer, or a marked-up document scanned by the Smart phone or tablet computer may be attached to the message by means of "choose files" button 208. The "send" button 210 transmits the field worker's message and attached photographs, videos, scanned documents, and other electronic files back to the central office. Personnel in the central office can follow up on the message to revise plan documents, task assignment, deliveries of building materials to the project site, etc., as warranted depending upon the content of the field worker's message.

In this manner, specific knowledge about the work project is captured by field workers 32 at the work site. This is useful to the work project because the field workers are remotely located at the work site proximate to the actual work that is being accomplished. Thus, they are more knowledgeable about the reality of the work project in its actual constructed, installed, or produced state than the construction manager, design team members, or project owner who are usually located in their offices, and may only occasionally visit the work site, if at all. The timely data collection from the front line of the field is imperative to obtaining improvement in labor efficiencies.

The field workers 32 will digitally capture historical information about the status of the work project or a specific work task that they are undertaking, and how the specific task is being performed in terms of materials, location, and installation technique. This last historic information capture for the work task is critical because how the project task is being conducted may deviate from the blueprints, specifications, and other instructions provided by the design team. Such deviations may be unintentional in which case it is important to communicate this information to the construction manager and design team members in case the work task should be redone properly in accordance with the blueprints, specifications, and other instructions. Otherwise, the blueprints, specifications, and other instructions for subsequent tasks may need to be modified in. order to fit this specific performed work task.

Finally, GUI 220 shown in FIG. 14 is accessed by the field worker 32 by pressing the "view schedule" button 150 in GUI 140 of FIG. 10. This GUT provides for the field worker a quick and convenient schedule by date 222 of the project assignments which have been assigned to him by the central office for that project or other projects. Because work assignments may change daily or even within the day due to issues arising for a work project, the field worker can stay up-to-date by means of this function under the construction management system.

The above specification, examples, and the accompanying drawings provide a. complete description of the structure and operation of the knowledge management system of the present invention. Since many embodiments of the invention can be made without departing from the spirit and scope of the invention, the invention resides in the claims hereinafter appended.

We claim:

1. A computer-implemented construction management system for managing the performance of a work task by a field worker having a mobile computer device for a work project at a remote project site, such system comprising:
   (a) a data interface for providing a communication link between the remote computer device used by the field worker at the project site and a central computer located at a central office;
   (b) such central computer having:
      (i) a database that stores an organized set of documents, information, and electronic images associated with one or more work rooms or construction objects for the project, or one or more work tasks to be performed at the project site for the project;
      (ii) a central processing unit and an internal or external memory unit incorporating a software program containing an organized set of instructions in coded language coupled to the database;
      (iii) such software program including a plurality of graphical user interfaces having one or more linked fields for the organized set of documents, information, and electronic images;

(c) a scannable indicia posted at the project site related to the room, construction object, or work task for the project;

(d) wherein when the field worker uses his mobile computer device to scan the scannable indicia at the project site, he automatically gains access to a graphical user interface containing the one or more linked fields for the organized set of documents, information, and electronic images associated with the room, construction object, or work tasks associated with that scannable indicia for the project;

(e) wherein the field worker may activate one or more of the linked fields within the graphical user interface to pull a transmitted copy of a document, information, or electronic image to assist him with his work task to be performed at the remote project site;

(f) wherein the organized set of documents, information, or electronic images stored on the database that are associated with the room, construction object, or work tasks associated with that scannable indicia may be updated by the central office from day to day.

2. The construction management system of claim 1, wherein the scannable indicia comprises a QR code.

3. The construction management system of claim 1, wherein the scannable indicia comprises a bar code.

4. The construction management system of claim 1, wherein the scannable indicia comprises a RFID tag.

5. The construction management system of claim 1 further comprising means for the field worker at the remote project site to attach a pictorial image, video, or written text description of the performed work task for transmission back to the central computer.

6. The construction management system of claim 1 further comprising means for the field worker at the remote project site to attach a pictorial image, video, or written text description to report an issue with respect to the work task or work project at the remote project site for transmission back to the central computer.

7. The construction management system of claim 1 further comprising means for the field worker to initiate a direct communication via the central computer with the project manager for the work task to be performed at the remote project site.

8. The construction management system of claim 1, wherein the remote computer device used by the field worker comprises a Smart phone or tablet computer.

9. The construction management system of claim 1, wherein the work project comprises a residential, business, or industrial building; a roadway, bridge, dam, or other civil engineering project; electrical, plumbing, HVAC, or stonework, tile, or finish carpentry project, skilled sub-portions of any construction project; underground or overhead wiring for a telecommunications installation and all equipment therefore; drilling equipment, refinery, plants, and pipelines for the oil and gas industry; airports, wastewater treatment, water, sewer, or storm sewer infrastructure operated by municipalities; or film production studios.

\* \* \* \* \*